(12) United States Patent
    Levit

(10) Patent No.: US 11,077,325 B2
(45) Date of Patent: Aug. 3, 2021

(54) FLAME AND PARTICULATE RESISTANT KNIT ARTICLE

(71) Applicant: DUPONT SAFETY & CONSTRUCTION, INC., Wilmington, DE (US)

(72) Inventor: Natalia V Levit, Glen Allen, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 616 days.

(21) Appl. No.: 15/455,730

(22) Filed: Mar. 10, 2017

(65) Prior Publication Data
    US 2017/0281992 A1    Oct. 5, 2017

Related U.S. Application Data

(60) Provisional application No. 62/316,642, filed on Apr. 1, 2016.

(51) Int. Cl.
    *A62B 17/00*    (2006.01)
    *B32B 7/05*    (2019.01)
    (Continued)

(52) U.S. Cl.
    CPC ............ *A62B 17/003* (2013.01); *A41D 13/05* (2013.01); *A41D 13/0512* (2013.01);
    (Continued)

(58) Field of Classification Search
    CPC .... A62B 17/003; A62B 17/04; A41D 31/085; A41D 2500/10; A41D 13/05;
    (Continued)

(56) References Cited

U.S. PATENT DOCUMENTS 5,150,476 A * 9/1992 Statham ............... A41D 31/085
                                                        2/93
5,153,941 A    10/1992 Grilliot et al.
(Continued)

OTHER PUBLICATIONS

"Modulus." Complete Textile Glossary. New York, NY: Celanese Acetate, 2001. N. pag. Print. (Year: 2001).*
(Continued)

*Primary Examiner* — Marla D McConnell
*Assistant Examiner* — Larissa Rowe Emrich

(57) ABSTRACT

An article of protective clothing comprising a durable multilayer fabric laminate formed from
 i) a first flame resistant knitted fabric made from yarns, the fabric having an average fabric modulus of 8 grams-force of greater;
 ii) a flame-resistant nonwoven fabric having a machine direction and a cross direction, and consisting of a plurality of continuous filaments having a diameter of less than 1000 nm, the filaments in the fabric being substantially oriented parallel with the machine direction and having stretch and recovery in the cross direction; and
 iii) a second flame resistant knitted fabric made from yarns, the fabric having an average fabric modulus of 8 grams-force of greater;
wherein the nonwoven fabric is positioned between and coextensive with the first and second flame-resistant knitted fabrics; the nonwoven fabric being attached to the first knitted fabric by a set of first attachment points, the attachment points defining a first unattached area having a first effective diameter; the nonwoven fabric also being attached to the second knitted fabric by a set of second attachment points, the attachment points defining a second unattached area having a second effective diameter; wherein both the first unattached
(Continued)

area and the second unattached area each have a value A, in square centimeters, according to the formula:

$$C < A \leq (14*B) + 100$$

the value B being the sum of the average fabric modulus of the first knitted fabric and the average fabric modulus of the second knitted fabric, in grams-force; and the value C being 5 square centimeters.

7 Claims, 1 Drawing Sheet

(51) Int. Cl.

| | |
|---|---|
| *B32B 5/26* | (2006.01) |
| *A41D 31/08* | (2019.01) |
| *A41D 13/05* | (2006.01) |
| *B32B 7/09* | (2019.01) |
| *B32B 5/06* | (2006.01) |
| *B32B 37/14* | (2006.01) |
| *D04B 1/16* | (2006.01) |
| *A62B 17/04* | (2006.01) |

(52) U.S. Cl.
CPC ............ *A41D 31/085* (2019.02); *A62B 17/04* (2013.01); *B32B 5/26* (2013.01); *B32B 7/05* (2019.01); *B32B 37/144* (2013.01); *D04B 1/16* (2013.01); *A41D 2500/10* (2013.01); *B32B 5/06* (2013.01); *B32B 7/09* (2019.01)

(58) Field of Classification Search
CPC .................. A41D 13/0512; B32B 5/26; B32B 5/02–026; B32B 5/06; B32B 5/24; B32B 7/04–7/14; B32B 37/144; B32B 2250/03; B32B 2250/20; B32B 2307/3065; B32B 2307/51; B32B 2379/08; B32B 2571/00; D04B 1/16; Y10T 428/24025; Y10T 428/249923; Y10T 428/31721; Y10T 442/488–494; Y10T 442/601; Y10T 442/696
USPC ...................... 428/101, 223, 473.5, 920–921; 442/318–319, 328, 414
See application file for complete search history.

(56) References Cited

U.S. PATENT DOCUMENTS

| | | | |
|---|---|---|---|
| 5,236,769 A | | 8/1993 | Paire |
| 5,274,850 A | | 1/1994 | Aldridge |
| 5,582,903 A | * | 12/1996 | Levy .................. A41D 13/1209 428/219 |
| 5,628,065 A | | 5/1997 | Austin |
| 5,681,645 A | * | 10/1997 | Strack ...................... B32B 7/14 428/196 |
| 5,823,188 A | | 10/1998 | Harges, Jr. et al. |
| 6,869,900 B2 | * | 3/2005 | Wyner .................. B32B 27/40 442/136 |
| 7,618,579 B2 | | 11/2009 | Kim et al. |
| 8,318,617 B2 | | 11/2012 | Blankenbeckler |
| 2004/0029473 A1 | * | 2/2004 | McKee .................. D03D 15/12 442/181 |
| 2009/0119824 A1 | | 5/2009 | Blankenbeckler |
| 2009/0186548 A1 | * | 7/2009 | Rock .................... A41D 31/102 442/335 |
| 2011/0014429 A1 | | 6/2011 | Dennes et al. |
| 2013/0065470 A1 | * | 3/2013 | Rock ........................ D04B 1/16 442/302 |
| 2013/0198941 A1 | * | 8/2013 | John .................... A62B 17/003 2/455 |
| 2014/0259331 A1 | * | 9/2014 | Maples ................ A41D 31/085 2/455 |
| 2015/0109063 A1 | | 4/2015 | Suzuki et al. |
| 2016/0039170 A1 | * | 2/2016 | Nutt .......................... B32B 7/14 428/196 |

OTHER PUBLICATIONS

"Hand." Complete Textile Glossary. New York, NY: Celanese Acetate, 2001. N. pag. Print. (Year: 2001).*
"Handle." Complete Textile Glossary. New York, NY: Celanese Acetate, 2001. N. pag. Print.*
"Handle-O-Meter." Thwing-Albert Instrument Company, Thwing-Albert Instrument Company, www.thwingalbert.com/media/brochures/Brochure_HandleOMeter.pdf.*
Sastri, Vinny R.. (2014). Plastics in Medical Devices—Properties, Requirements, and Applications—8.3 Polyimides. Elsevier. Retrieved from https://app.knovel.com/hotlink/pdf/id:kt00UR06G1/plastics-in-medical-devices/polyimides (Year: 2014).*
International Search Report and the Written Opinion, dated Jul. 13, 2017, for International Application No. PCT/US2017/023569, filed Mar. 22, 2017, European Patent Office.

* cited by examiner

FLAME AND PARTICULATE RESISTANT KNIT ARTICLE

BACKGROUND OF THE INVENTION

Field of the Invention

This invention concerns an article of protective clothing that is both flame resistant and resistant to the ingression of particles.

Background of the Invention

Improvements in flame resistant protective apparel such as that designed for fire fighters has generally been directed at improved flame, thermal, or comfort performance. Further, it has been recognized that smoke from flames is an inhalation threat for fire fighters. However, until recently the health threat posed by the deposition on the skin of particulates, such as the soot and other atomized particles in smoke, has not been fully understood or appreciated.

Fire-fighting turnout gear having multiple and thick layers of various materials by their nature provide some protection from the ingress of particles. However, any number of other pieces of protective gear such as neck coverings including such things as cowls, head coverings including such things as hoods, collars, and related articles that connect various pieces of protective gear are typically more lightweight, generally to because they need to be very flexible.

U.S. Pat. No. 5,153,941 to Grilliot et al. discloses a firefighter's coat that has a chin and neck protective member that is adjustably and removably attached to the collar portion of the firefighter's coat. U.S. Pat. No. 5,274,850 to Aldridge discloses a firefighter coat and hood combination in which the hood is easily attachable to and removable from the coat for replacement and cleaning. U.S. Pat. No. 5,628,065 to Austin discloses a firefighter hood with a pocket for containing a required clothing label. U.S. Pat. No. 5,823,188 to Harges, Jr. et al. discloses a heat and fire resistant respiratory filtration mask specially adapted for protecting firefighters in wildland/brush fire environments, wherein one embodiment the mask is elongated to provide heat and flame protection to the neck as well as the entire facial area below the eyes. Again, until recently it was not fully recognized that clothing articles such as these were a "weak link" in preventing hazardous particle ingression and deposition on the skin.

Therefore to address this serious health concern, what is needed is a structure that is not only flame resistant, but also breathable, flexible, lightweight, and in addition, provides protection against the ingression of particles. Further, from a practical standpoint, this structure must survive rough handling and multiple laundering. U.S. Pat. No. 8,318,617 to Blankenbeckler discloses a cleanroom garment containing a nanoweb bonded in a face-to-face relationship with a fabric and a second fabric, and in one embodiment the garment comprises a multilayer fabric laminate of a nanoweb bonded to and aligned between two fabrics. The garment has a certain particle filtration efficiency when new and another lower particle filtration efficiency after a certain number of washes. The nanoweb and fabrics are bonded to each other by various bonding techniques, and this face-to-face bonding of the lightweight nanoweb to the more mechanically sound outer fabrics provides both stability to the nanoweb and also prevents relative localized movement between the fabric layers. Heretofore it has been thought that such movement is undesirable, because one would expect that any localized movement, with its associated layer-to-layer friction between the surfaces of the nanoweb and the surfaces of the outer fabrics, would simply destroy the lightweight nanoweb. Further, if given a choice, such face-to-face bonded laminates would generally not be desirable for such as neck coverings including cowls, head coverings including hoods, collars, and related articles, because such laminates do not allow the fabrics to independently move and slide upon each other.

United States Pat. Appl. Pub. No. US2015/109063 to Simmonds et al. discloses a nonwoven having elastic stretch and recovery properties and discloses that in a garment, the elastic property of the nonwoven could provide ease of movement and comfort. What is needed therefore is a way to utilize such an elastic nonwoven in an article of protective clothing, such as a neck covering including such things as a cowl, a head covering including such things as hoods, a collar, or a related article that connects protective gear, in the form of a laminate that provides consistent protection from both fire and flames and the atomized particles in smoke, even after repeated laundering. In particular what is needed is a protective article made with a fabric laminate wherein the fabrics in the laminate have some degree of independent localized movement relative to one another for improved flexibility and comfort, while remaining both flame resistance and durable enough to withstand the intended use as a particulate barrier in firefighter gear.

SUMMARY OF THE INVENTION

This invention relates to an article of protective clothing comprising a durable multilayer fabric laminate formed from the following layers, in order, i) a first flame resistant knitted fabric made from yarns, the fabric having an average fabric modulus of 8 grams-force of greater;

ii) a flame-resistant nonwoven fabric having a machine direction and a cross direction, and consisting of a plurality of continuous filaments having a diameter of less than 1000 nm, the filaments in the fabric being substantially oriented parallel with the machine direction and having stretch and recovery in the cross direction; and iii) a second flame resistant knitted fabric made from yarns, the fabric having an average fabric modulus of 8 grams-force of greater;

wherein the nonwoven fabric is positioned between and coextensive with the first and second flame-resistant knitted fabrics; the nonwoven fabric being attached to the first knitted fabric by a set of first attachment points, the attachment points defining a first unattached area having a first effective diameter; the nonwoven fabric also being attached to the second knitted fabric by a set of second attachment points, the attachment points defining a second unattached area having a second effective diameter; wherein both the first unattached area and the second unattached area each have a value A, in square centimeters, according to the formula:

$$C < A < /= (14*B) + 100$$

the value B being the sum of the average fabric modulus of the first knitted fabric and the average fabric modulus of the second knitted fabric, in grams-force; and the value C being 5 square centimeters.

DETAILED DESCRIPTION

Figure 1:
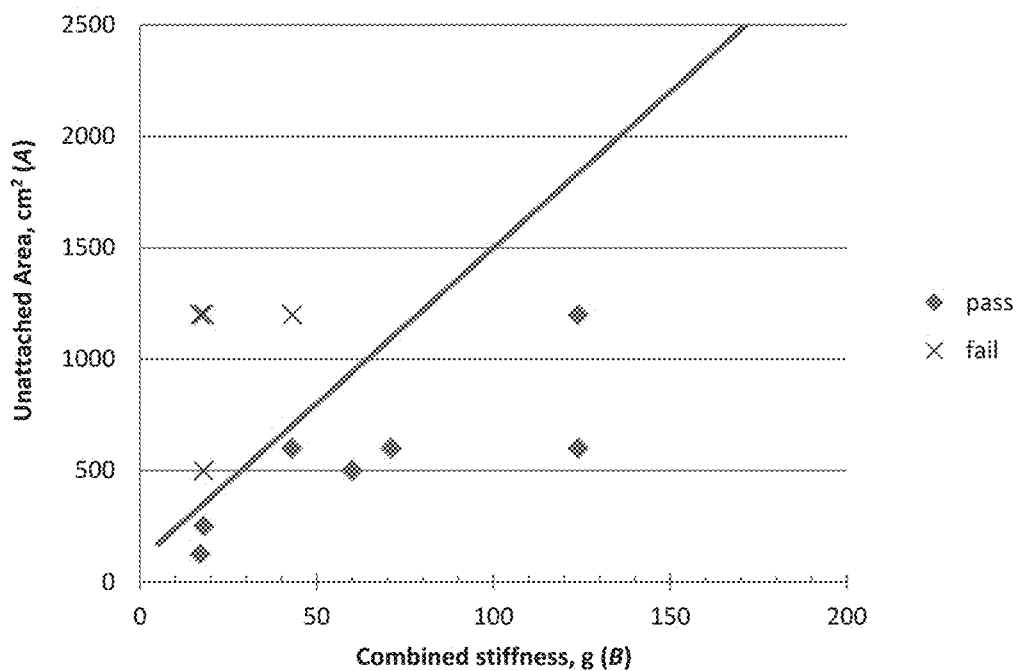
FIG. 1 is graph showing the relationship between the combined stiffness of the knit fabrics B (also referred to herein as the sum of the average fabric modulus) and the unattached area A of the multilayer fabric laminate.
Figure 2:
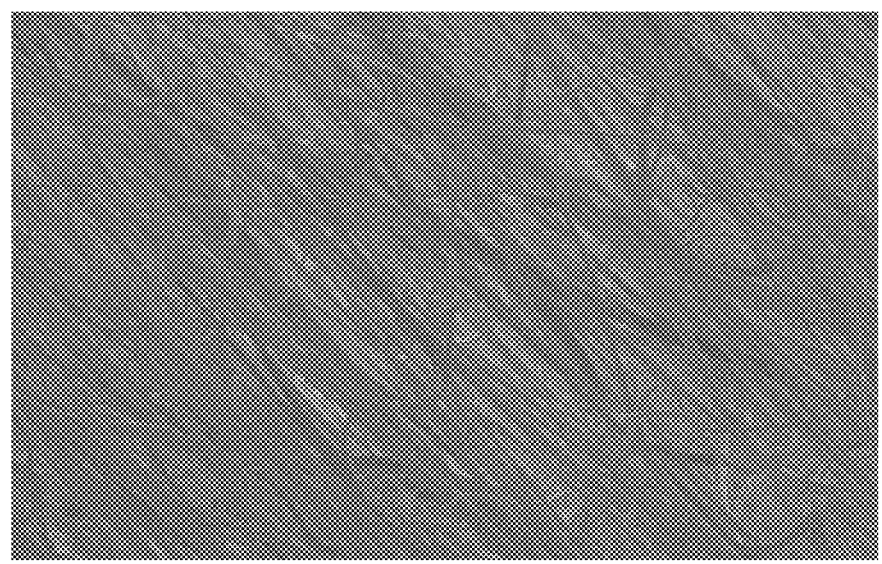
FIG. 2 is a digital image of a nonwoven fabric consisting of a plurality of continuous filaments having a diameter of less than 1000 nm, the filaments in the fabric being substantially oriented parallel with the machine direction and having stretch and recovery in the cross direction.

This invention relates to an article of protective clothing comprising a durable multilayer fabric laminate having unattached areas for localized relative movement and improved flexibility that is both flame resistant and resistant to the ingression of particles and is durable after repeated laundering. Such protective apparel includes but is not limited to such things as hoods, cowls, collars, and any number of types of apparel used to connect or augment the flame and heat resistance of gear worn by firefighters.

The durable multilayer fabric laminate is formed from a first outer flame resistant knitted fabric, an internal flame-resistant nonwoven fabric having stretch and recovery consisting of a plurality of continuous filaments having a diameter of less than 1000 nm, and a second outer flame resistant knitted fabric, the nonwoven fabric being sandwiched between the two knit fabrics.

It has been found that in order for the multilayer fabric laminate to be durable, the outer flame resistant knit fabrics should have adequate stiffness to reduce localized friction between the layers, which damages the internal flame-resistant nonwoven fabric. It has been found that the outer flame resistant knit fabrics should have an average fabric modulus of 8 grams-force or greater. The "average fabric modulus" is the arithmetic average of measured fabric modulus in the machine direction and the measured fabric modulus in the cross direction in the fabric. In the case of a knit, this is the average of the modulus measured in perpendicular directions in the fabric, as in measuring the fabric modulus parallel to the vertical row of loops known as a wale and the fabric modulus parallel to the horizontal or crosswise row of loops known as a course. In some embodiments, the average fabric modulus is 30 grams-force or greater. To avoid the multilayer fabric laminate from becoming too stiff, in some preferred embodiments, the average fabric modulus of one of the knit fabrics can be 150 grams-force or less. However, in some desired embodiments the average fabric modulus of both of the knit fabrics is 150 grams-force of less.

From a production simplification standpoint the first flame resistant knitted fabric and the second flame resistant knitted fabric can be the same and this is a preferred embodiment. However, other embodiments are possible. For example, in some embodiments the two knitted fabrics can be made from the same type of yarn but constructed differently (different yarn count or knit gauge) resulting in different average fabric moduli; however with the stipulation that both knit fabrics have the claimed average fabric modulus. Likewise, two flame resistant knit fabrics made from different flame resistant yarns are possible as long as they have the claimed average modulus.

Therefore, the article of protective clothing comprises a durable multilayer fabric laminate formed from the following layers, in order, a first flame resistant knitted fabric made from yarns, the fabric having an average fabric modulus of 8 grams-force of greater; a flame-resistant nonwoven fabric having a machine direction and a cross direction, consisting of a plurality of continuous filaments having a diameter of less than 1000 nm, the filaments in the fabric being substantially oriented parallel with the machine direction and having stretch and recovery in the cross direction; and a second flame resistant knitted fabric made from yarns, the fabric having an average fabric modulus of 8 grams-force of greater.

In the multilayer fabric laminate, the nonwoven fabric is positioned between and coextensive with the first and second flame-resistant knitted fabrics. This provides adequate particulate resistance throughout the article, or that portion of the article that contains the multilayer fabric laminate. It is believed the entire multilayer laminate should have a basis weight of at least 5 oz/yd$^2$ (170 g/m$^2$) and in preferred embodiments a basis weight of at least 10 oz/yd$^2$ (340 g/m$^2$). In some embodiments, the laminate has a basis weight of 25 oz/yd$^2$ (850 g/m$^2$) or less. In some preferred other embodiments, the laminate has a basis weight of 20 oz/yd$^2$ (680 g/m$^2$) or less.

For improved flexibility and comfort in the article, the nonwoven is attached to each of the knitted fabrics in a manner that allows some independent localized movement of three fabrics relative to one another. Specifically, the nonwoven fabric is attached to the first knitted fabric by a set of first attachment points, and those attachment points define a first unattached area having a first effective diameter. Further, the nonwoven fabric is also attached to the second knitted fabric by a set of second attachment points, and those attachment points define a second unattached area having a second effective diameter.

The sets of attachment points are preferably points of mechanical attachment of the layers. Some methods of mechanical attachment include, but are not limited to, sewing or stitching with a thread. One especially useful method is to sew or stitch the two layers together using flame retardant thread, such as Nomex® aramid thread (available from Atlantic Thread and Supply, Baltimore, Md.). The nonwoven fabric can be first attached to a first knit fabric and then subsequently attached to a second knit fabric using different sets of attachment points, or if desired, the first and second knit fabrics and the nonwoven fabric inserted therebetween can be attached using the same attachment points. In a preferred embodiment multiple layers are cut into a pattern and then are attached together to form the laminate and used in garment applications as though it was a single thermal liner fabric.

Each of the sets of attachment points define an unattached area between each of the knit fabrics and the nonwoven fabric, the unattached area having an effective diameter. As used herein the phrase "effective diameter" is the diameter of the largest circle that fits within the area formed by the set of attachment points. The most useful laminates are thought to be those that have the largest amount of unattached area between the fabrics. These allow the most localized movement between the fabrics and therefore are believed to form the most flexible and comfortable articles.

However, as previously mentioned herein, too much localized movement between the fabrics can hurt the durability of the lightweight nonwoven fabric. The inventors have found a synergy between the stiffness of the two knitted fabrics and the amount of unattached area, such that a durable protective article can be produced. Specifically, the inventors have found that durable articles can be made if both the first unattached area and the second unattached area each have a value A, in square centimeters, according to the formula:

$$C < A < /= (14*B) + 100$$

the value B being the sum of the average fabric modulus of the first knitted fabric and the average fabric modulus of the second knitted fabric, in grams-force; and the value C being 5 square centimeters. (By (14*B) it is meant 14 multiplied by B.) An unattached area of 5 square centimeters or less is believed to attach the fabrics together too tightly and not provide adequate unattached area between the fabrics such that useful localized movement can occur. In many preferred embodiments wherein the protective article is a neck covering, including such things as a cowl, a head covering including such things as hoods, a collar, or a related article that connects protective gear, the first unattached area and the second unattached area each have a value A, in square centimeters, of 1200 square centimeters or less. FIG. 1 is a graphical representation of the relationship between the combined stiffness of the knit fabrics and the unattached area of the multilayer fabric laminate. As used herein, the word "durable" used in regard to the laminate is meant the laminate (1) can withstand up to 20 home laundry (HML) cycles without the size dimensions of the laminate changed more than 5% from its original size or being irreversibly distorted; (2) after 20 HML cycles the laminate can be stretched 30% in the cross direction 50 times without any tear in the interior nonwoven fabric larger than 2 mm in length.

The first and second knit fabrics are flame resistant, and as used herein the phrase "flame resistant" means the polymer, fiber, yarn, or fabric will not support a flame in air. In preferred embodiments these materials have a Limiting Oxygen Index (LOI) of 21 or greater, and in some embodiments the materials have a LOI of 26 or greater (when made into a form useful for measuring such). In some embodiments, the knit fabrics have basis weights in the range of from about 3 to 10 oz/yd$^2$ (102 to 340 g/m$^2$). In some preferred embodiments the knit fabrics have basis weights in the range of from about 6 to 8 oz/yd$^2$ (204 to 272 g/m$^2$).

Knit fabrics include a structures producible by interlocking a series of loops of one or more yarns by means of needles or wires, such as warp knits (e.g., tricot, milanese, or raschel) and weft knits (e.g., circular or flat). The knit structure provides increased mobility for the yarns in the fabric during use in apparel, allowing for improved fabric flexibility and expansion. Flexibility is affected by tightness of the knit and that tightness can be adjusted to meet any specific need including garment comfort and fit.

The use of the knit flame retardant fabric allows the outer fabric layers of the laminate to have more stretch and movement than if the outer fabric layers were woven. In some embodiments the knit fabric is a warp-knit fabric made in a plane jersey construction or a weft-knit; however, in a preferred embodiment the knit is a warp-knit fabric. It is believed other knits, including but not limited to terry or rib knits could also be used.

In some preferred embodiments the knit can stretch 10 percent or more in at least one direction, as measured by ASTM D2594 "Standard Test Method for Stretch Properties of Knitted Fabrics Having Low Power". In some preferred embodiments the knit can stretch or elongate more than 50 percent in at least one direction. In some preferred embodiments the knit can stretch or elongate more than 85 percent in at least one direction. It is believed that a knit fabric having a maximum extension of about 200% is suitable for use as the first and/or second knit fabrics in the multilayer fabric laminate. This allows garment being comfortably donned and doffed as well as this layer to match the stretch and recovery of the nonwoven fabric to which it is attached.

The first and second flame resistant knit fabrics are made from yarns, and preferably these yarns comprise flame resistant fibers or blends. The yarns can be continuous multifilament yarns or staple fiber yarns.

Suitable flame resistant fibers include but are not limited to those made from aromatic polyimide, polyareneazole, melamine, polyacrylonitrile, polyimide, polyamide-imide, polyether-imides, polyacrylate, polyetherketone, polysulfone, polyethersulfone, and mixtures thereof. Preferred fibers are made from meta-aramid, para-aramid, polybenzazole, polybenzimidazole and polyimide polymer. In some embodiments, the yarns include flame resistant fibers have a yarn tenacity of at least 3 grams per denier (2.7 grams per dtex). Especially suitable flame resistant fibers include blends of meta- and para-aramid fibers. One preferred fiber blend of 93% meta-aramid, 5% para-aramid and 2% carbon core nylon antistatic fiber available from E.I. DuPont de Nemours, Wilmington, Del.

The knit fabrics preferably serve as the effective flame retardant outer layers of the laminate used in the article of protective apparel, effectively providing mechanical protection (such as cut and/or abrasion protection) for the flame-resistant nonwoven fabric positioned between the two knitted fabrics.

The nonwoven fabric positioned between and coextensive with the first and second flame-resistant knit fabrics is also flame-resistant, meaning the nonwoven fabric comprises filaments made from a synthetic polymer having a limiting oxygen index (LOI) of at least 21, preferably at least 26 or higher. A majority of the filaments in the flame-resistant nonwoven fabric are also substantially aligned and oriented parallel in one direction in the fabric, normally the machine direction, and have stretch and recovery in the opposing direction, normally the cross direction.

Useful polymers for making the flame-resistant nonwoven fabric include polymers that can be spun into continuous filaments that can be collected as a web, and that once in that web the web can be further drawn to align and orient a majority of the filaments in the web in one direction, generally in the machine direction, and then the web can be treated to set the filaments (generally with heat) to retain that alignment and orientation. It is believed that such polymers include various polyimides (including fully aromatic polyimide), aromatic polyimide, polytetrafluoroethylene, polyimide-amide, polyareneazole, and mixtures thereof. In some embodiments, polymers containing polyimide are especially preferred.

To help prevent the ingression of the particulates, the flame-resistant nonwoven fabric consists of a plurality of continuous filaments having a diameter of 1000 nm or less. In some embodiments the filaments have a diameter of 900 nm or less; and in some embodiments the fiber diameters range from 100 and 600 nm. In the case of non-round cross-sectional nanofibers, the term "diameter" as used herein refers to the greatest cross-sectional dimension. As expressed herein that the fabric "consists of" continuous filaments of certain diameters, it is understood that this means that greater than 98% of the weight of the nonwoven has the stated diameter or diameter range; the realities of fiber spinning dictating that a very minor and inconsequential amount of higher diameter filaments could be present due to normal process variations.

In some embodiments, the use of nonwoven fabric as described herein provides a laminate that has a filtration efficiency as measured according to ASTM F2299 of at least 85%, both before and after 20 home laundry cycles. In some preferred embodiments, the laminate has a filtration efficiency both before and after 20 home laundry cycles of at least 90%. In some most preferable embodiments, the laminate has a filtration efficiency of 95% or greater prior to 20 home laundry cycles and a filtration efficiency of 90% or greater after 20 home laundry cycles, and a laminate having a filtration efficiency of 95% or greater after 20 home laundry cycles is even more preferred.

The basis weight of the flame-resistant nonwoven fabric is preferably 12 to 50 grams per square meter. In some embodiments the basis weight is 12 to 35 grams per square meter, and some especially useful basis weights are those that range from 15 to 35 grams per square meter. In some embodiments, the basis weight of the nonwoven fabric is 18 grams per square meter or higher, and in some embodiments a nonwoven having a basis weight of 25 grams per square meter is desirable. One preferred maximum basis weight of the nonwoven fabric is 50 grams per square meter; one especially preferred maximum basis weight of the nonwoven fabric is 35 grams per square meter In some preferred embodiments, the nonwoven fabric has a mean flow pore size (or "mean flow pore" (MFP)) of 10 micrometers or less. In some embodiments, the mean flow pore size is 8 or less, in some other embodiments the mean flow pore size is 4 or less. It is believed a suitable minimum mean flow pore size is 1 micrometer.

The mean flow pore size of a nonwoven fabric is a quantity measured using liquid according to ASTM Designation E 1294-89, "Standard Test Method for Pore Size Characteristics of Membrane Filters Using Automated Liquid Porosimeter." Surprisingly, it has been found that this method, which uses liquids, is very useful in characterizing suitable nonwoven fabrics for use in fire resistant article applications. It is believed that nonwoven fabrics having a mean flow pore size of greater than 10 micrometers do not appear to have the adequate "tightness" to be suitable for use in preventing ingression of particles less than 1 micron. Further it is believed that nonwoven fabrics having mean flow pore sizes as low as 1.5 micrometers are useful In some preferred embodiments, the nonwoven fabric has an air permeability of 3 to 40 cubic feet per minute (cfm) (0.9 to 12.2 m$^3$/m$^2$ min). In some embodiments, the air permeability of the nonwoven fabric is 10 to 25 cfm (3 to 7.6 m$^3$/m$^2$ min). In some embodiments, the porosity of the nonwoven fabric is 70% or greater. In some preferred embodiments the porosity of the nonwoven fabric is 80% or greater, and in some most preferred embodiments the porosity of the nonwoven fabric is 90% or greater.

The flame-resistant nonwoven fabric has a machine direction and a cross direction, and because the filaments in the fabric are substantially oriented parallel with the machine direction the fabric has a degree of stretch and recovery in the cross direction. The anisotropic properties of the nonwoven are such that the elongation to break in the cross direction is approximately thirty times the elongation to break in the machine direction. In addition, extensions of the nonwoven in the cross direction of less than the break elongation are highly recoverable, with recovery of 90% or more at extensions up to 50% and recovery of 80% or more at extensions up to 75%. In one embodiment, a recovery of 95% or more at extensions up to 50% and a recovery of 85% or more from extensions up to 75%. In some preferred embodiments, the nonwoven has a recovery of 97% or more from extensions up to 50% and a recovery of 90% or more from extensions up to 75%. It is believed that the flame-resistant nonwoven having a maximum extension of about 100% is suitable for use in the multilayer fabric laminate.

One process for making a nonwoven sheet having this degree of stretch and recovery is found in United States Pat. Appl. Pub. No. US2015/109063 to Simmonds et al. In this process an electroblowing method is used that comprises feeding a solution of a polymer in a solvent from mixing chamber through a spinning beam, to a spinning nozzle to which a high voltage is applied, while compressed gas is directed toward the polymer solution in a blowing gas stream as it exits the nozzle. Fibers are formed and collected as a web on a grounded collector under vacuum.

In one preferred embodiment, a polymer precursor for a thermoset polymer such as a polyamic acid is spun into sheet of generally continuous polymer precursor filaments using this process. The as-spun sheet is then drawn to align and orient these filaments in the machine direction. The drawn sheet is then exposed to heat to complete the heat setting of the polyamic acid precursor fiber into a polyimide (e.g., imidized). This drawing and heating can be accomplished in a horizontal infrared oven without web restriction in the cross web direction. This allows the drawing of the spun sheet to align and orient the filaments in the machine direction while also heat setting the filament structure of the fabric. Alternatively, the polyamic acid sheet can be spun and then imidized prior to drawing; and the sheet is then subsequently drawn while exposed to heat to complete the fiber alignment in the machine direction.

Test Methods

Fabric Modulus. The stiffness or modulus of the knit fabrics is measured using a "handle-o-meter" instrument manufactured by Thwing Albert instrument Co (Philadelphia, Pa.) using IST 90.3(1). The instrument measures in grams the resistance that a blade encounters when forcing a specimen of material into a slot. The fabric modulus is measured in the machine direction and cross direction of the fabric. These two values are then averaged to obtain the average fabric modulus. In the case of a knit, is the average of the modulus measured in perpendicular directions in the fabric, as in measuring the fabric modulus parallel to the vertical row of loops known as a wale and the fabric modulus parallel to the horizontal or crosswise row of loops known as a course.

Mean Flow Pore. The mean flow pore size of the nonwoven is a quantity measured according to ASTM Designation E 1294-89, "Standard Test Method for Pore Size Characteristics of Membrane Filters Using Automated Liquid Porosimeter." A capillary Flow Porometer CFP-2100AE (Porous Materials Inc. Ithaca, N.Y.) is used. Individual samples of the nonwoven of 25 mm diameter are wetted with a low surface tension fluid (1,1,2,3,3,3-hexafluoropropene, or "Galwick," having a surface tension of 16 dyne/cm) and placed in a holder, and a differential pressure of air is applied and the fluid removed from the sample. The differential pressure at which wet flow is equal to one-half the dry flow (flow without wetting solvent) is used to calculate the mean flow pore size using supplied software.

Thickness. Thickness measurements of the FABRICS is determined according to ASTM 5947 using 10 kPa (1.45 psi) pressure and a 15 mm diameter foot (precision thickness gauge FT3 Hanatek Instruments, east Sussex, UK). The thickness measurement of the multilayer fabric laminate is measured as per ASTM D1777-96 Option 1 using a standard pedestal mounted micrometer having 50.8 mm diameter foot and pressure 0.9 kPa (0.13 psi).

Basis Weight. The basis weight of the nonwoven fabric and the knit fabrics was determined according to ASTM D-3776. The basis weight of the composite fabric was determined from the weight of the 6.75 inch×6.75 inch TPP test specimens.

Porosity. Porosity is calculated by dividing the basis weight of the sample in g/m² by the polymer density in g/cm³ and by the sample thickness in micrometers and multiplying by 100 and subsequently subtracting from 100%, i.e., percent porosity=100−basis weight/(density× thickness)×100.

Air Permeability. The Air Permeability is measured according to ASTM D737 at 125 Pa pressure difference.

Filtration performance. Filtration efficiency is measured according to ASTM F2299 at varied face velocities (flow rates) and particle sizes in a range 0.015-0.8 micron using CertiTest Model 3160 fractional efficiency tester from TSI Incorporated (St. Paul, Minn.). Both salt and oil particles are used. Filtration efficiency and pressure drop (resistance) in mm of water column are reported. Face velocity of 0.4 cm/sec corresponds to 2.3 liters/min flow.

Mechanical properties (tenacity, modulus, elongation, etc.) of the fabrics are determined using ASTM D5035 and recovery of the nonwoven fabric is determined using ASTM D3107.

Items are laundered using a protocol in accordance with the AATCC Home Laundering Test Method. To determine the laundry performance of the nonwoven fabric by itself, the nonwoven fabric was laundered after being sewn inside Tyvek® spunbonded fabric protective covers and tested with Tyvek® spunbonded fabric removed.

Example 1

Several precursor nonwoven sheets for forming nonwoven fabrics N1 to N7, were made by electroblowing a polyamic acid (PAA) solution comprising pyromellitic dianhydride (PMDA), oxy-dianiline (ODA) and dimethylformamide (DMF) into precursor nonwoven sheets of generally continuous polymer precursor filaments a manner similar to the process described in U.S. Pat. No. 7,618,579 and U.S. Pat. App. Pub. No. 2011/0144297. The precursor sheets were then further treated in a horizontal infrared oven without web restriction in the cross web direction as follows.

Highly elastic nonwoven fabric N1 was made by consecutive stretching and imidization of a precursor nonwoven sheet in accordance with the disclosure of United States Patent Appl. Pub. No. US2015/109063 to Simmonds et al. In this process, the precursor sheet was drawn to align and orient the filaments in the machine direction, and the drawn precursor sheet was then exposed to heat to complete the heat setting (i.e., imidization) of the polyamic acid precursor fiber into a polyimide nonwoven fabric.

Highly elastic nonwoven fabrics N2 to N5 were made by the alternative method of exposing the precursor sheet to heat to complete the imidization of the precursor filaments prior to stretching. These imidized sheets were then drawn to align and orient these polyimide filaments in the machine direction while exposing the sheets to temperatures above the 450 degrees Celsius, which is above the glass transition of the polyimide, to form the polyimide nonwoven fabric.

Nonwoven fabrics N6 and N7 were imidized but were not subjected to any stretching and therefore were not highly elastic.

The durability of the Nonwoven fabrics N1-N7 was then determined by laundering the nonwoven fabrics sewn between two layers of Tyvek® spunbonded polyolefin. The two layers of Tyvek® spunbonded polyolefin acted as a protective cover for the nonwoven fabrics during laundering. The two layers of Tyvek® spunbonded polyolefin were then removed and the nonwoven fabrics examined and tested. It was found that the stretch and recovery properties of the N1-N7 nonwoven fabrics were preserved after 20 home laundry (HML) cycles.

The properties of nonwoven fabric N1 to N7 are shown in the Table 1.

TABLE 1

| Item | Basis Weight, gsm | Thickness, micrometers | Air Permeability, m3/m2-min | MFP, micrometers | Elongation (CD) % |
|---|---|---|---|---|---|
| N1 | 29 | 152 | 3 | 3.8 | 70 |
| N2 | 17 | 140 | 8 | 7.3 | 80 |
| N3 | 25 | 225 | 5 | 6.0 | 74 |
| N4 | 15.1 | 158 | 9 | 6.5 | 90 |
| N5 | 12 | 140 | 11 | 7.8 | 68 |
| N6 | 18 | 121 | 3 | 3.6 | 30 |
| N7 | 6 | 50 | 12 | 5.0 | 30 |

The average fabric modulus of five types of flame resistant (FR) knit fabrics was determined before and after 20 home laundry (HML) cycles. Knit 1 was a knit fabric obtained from a Workrite 258TS70 shirt made of a jersey knit fabric of aramid and FR rayon fiber. Knits 2-4 were rib knit fabrics of aramid and aramid/FR rayon blends obtained from SSM Industries. Knit 5 was a FR cotton interlock knit fabric obtained from a Bulwark SEK2 Navy Flame-Resistant shirt, purchased from Professional Safety Supply. Jersey Knit 1 and interlock Knit 5 each had lower elongation in the cross direction than the rib knits 2-4 by virtue of the knit structure. The properties of the knits are shown in the Table 2.

TABLE 2

| Knit | Average Modulus Before Washing, (grams) | Average Modulus After 20 cycles, (grams) |
|---|---|---|
| 1 | 9.0 | 8.5 |
| 2 | 33 | 22 |
| 3 | 12 | 9 |
| 4 | 73 | 62 |
| 5 | 40 | 30 |

The knit and nonwoven fabrics were assembled into multilayer fabric laminates in the form of different-sized test swatches with the nonwoven fabrics placed in between two knit fabrics with the edges of the three fabrics sewn together around the perimeter. The amount of unattached area in the middle of the swatches between the stitches on the sewn edges (the attachment points) was determined by measuring the distance and computing the area using geometric methods (for example, measuring the distance from the stitches on one sewn edge across the unattached area to the stitches on the opposing edge, and calculating an area of a circle having that diameter). The swatches were then individually washed and dried using Home Laundry Protocol (HML) per AATCC 135-2010 and were visually inspected after each cycle, up to a total of 20 cycles. The sample was deemed to have failed if the size of the swatch changed after a cycle by more than 5% from the original size or after a cycle the shape of the swatch was irreversibly distorted from the original shape. The knit and nonwoven fabric combinations are shown the Table 3. The knit modulus shown is the sum of the average knit modulus measured in machine direction and cross direction of the knit 1 and 2 as was reported for individual layers in the Table 2. This sum of knit modulus is shown as Combined Stiffness in FIG. 1.

TABLE 3

| Laminate | Side 1 Knit | Side 2 Knit | Sum of Knit Modulus, Before Washing, g | Sum of Knit Modulus, After 20 Cycles, g | Nonwoven Fabric | Area, (cm$^2$) | After 20 Cycles, Visual Inspection | After 20 Cycles, 30% Elongation |
|---|---|---|---|---|---|---|---|---|
| 1-1 | 1 | 1 | 18 | 17 | N1 | 125 | pass | pass |
| 1-2 | 2 | 2 | 66 | 43 | N3 | 600 | pass | pass |
| 1-3 | 3 | 3 | 24 | 18 | N3 | 250 | pass | pass |
| 1-4 | 3 | 4 | 85 | 71 | N3 | 600 | pass | pass |
| 1-5 | 4 | 4 | 146 | 124 | N3 | 1200 | pass | pass |
| 1-6 | 4 | 4 | 146 | 124 | N2 | 600 | pass | pass |
| 1-7 | 4 | 4 | 146 | 124 | N4 | 600 | pass | pass |
| 1-8 | 4 | 4 | 146 | 124 | N5 | 600 | pass | pass |
| A-1 | 5 | 5 | 80 | 60 | N6 | 500 | pass | fail |
| A-2 | 5 | 5 | 80 | 60 | N7 | 500 | fail | |
| A-3 | 1 | 1 | 18 | 17 | N3 | 1200 | fail | |
| A-4 | 2 | 2 | 66 | 43 | N3 | 1200 | fail | |
| A-5 | 5 | 5 | 24 | 18 | N2 | 1200 | fail | |
| A-6 | 5 | 5 | 24 | 18 | N6 | 500 | fail | |

Laminates 1-1 through 1-8 were found to be durable after repeated laundry cycles when the amount of unattached area was below the line in the FIG. 1. The laundered laminates 1-1 were also then subjected to the additional stretch of 30% in cross direction 50 times to simulate the garment use. Then the composites were inspected for the visual damage using transmitted light. The laminate was considered to fail if any visual tear larger than 2 mm in length was detected in the nonwoven fabric.

Comparative laminate A-1 passed the laundry test but failed the stretch test because the N6 nonwoven fabric has no stretch and recovery. Comparative laminates A-2 through A-6 were not found to not pass the laundry or extension to 30%, because either area between connection points was too large (or the knit stiffness too small) or the nonwoven fabric had no stretch and recovery.

Example 2

Select durable to laundry laminates from Example 1 were subjected to the filtration efficiency testing using salt (NaCl) particles in a range of 0.1-0.8 micrometers and face velocities of 0.4 cm/s. The filtration efficiency results for 0.3 micrometer particles are presented in the Table 4. It is clear that the laminates maintain very good particle filtration efficiency after 20 washing cycles.

TABLE 4

| Laminate | Side 1 knit | Side 2 knit | Nonwoven Fabric | Filtration Efficiency, Before Washing, (%) | Filtration Efficiency, After 20 Cycles, (%) |
|---|---|---|---|---|---|
| 1-2 | 2 | 2 | N3 | 99.9 | 99.8 |
| 1-4 | 3 | 4 | N3 | 99.1 | 98.9 |
| 1-7 | 4 | 4 | N4 | 99 | 95.8 |
| 1-8 | 4 | 4 | N5 | 98.9 | 87 |

What is claimed is:

1. An article of protective clothing comprising a durable laminate formed from the following layers, in order,
i) a first flame resistant knitted fabric made from yarns, the first flame resistant knitted fabric having an average fabric modulus of 8 grams-force or greater;
ii) a flame resistant nonwoven fabric having a machine direction and a cross direction, and consisting of a plurality of continuous filaments having a diameter of less than 1000 nm, the plurality of continuous filaments in the flame resistant nonwoven fabric being substantially oriented parallel with the machine direction and wherein the flame resistant nonwoven fabric has stretch and recovery in the cross direction; and
iii) a second flame resistant knitted fabric made from yarns, the second flame resistant knitted fabric having an average fabric modulus of 8 grams-force or greater;
wherein the flame resistant nonwoven fabric is positioned between and coextensive with the first and second flame resistant knitted fabrics;
the flame resistant nonwoven fabric being attached to the first flame resistant knitted fabric and the second flame resistant knitted fabric by sets of attachment points that are points of mechanical attachment of the layers via sewing,
wherein the flame resistant nonwoven fabric is attached to the first flame resistant knitted fabric and the flame resistant nonwoven fabric is attached to the second flame resistant knitted fabric using the same attachment points,
each set of attachment points defining an unattached area for localized movement between the flame resistant nonwoven fabric and the first and second flame resistant knitted fabrics, each such unattached area having an effective diameter that is the diameter of the largest circle that fits within the area formed by the set of attachment points;
wherein each unattached area has a value A that is the calculated area, in square centimeters, of a circle having said effective diameter,
the value A further being 1200 square centimeters or less but greater than 5 square centimeters and related to the average fabric modulus of the first flame resistant knitted fabric and the average fabric modulus of the second flame resistant knitted fabric according to the formula:

$$A \leq (14\ cm^2/g\text{-force} * B) + 100$$

the value B being the sum of the average fabric modulus of the first flame resistant knitted fabric and the average fabric modulus of the second flame resistant knitted fabric, in grams-force;

wherein the knitted fabric average fabric modulus is the average of the measured fabric modulus as measured parallel to the vertical row of loops known as a wale and the measured fabric modulus as measured parallel to the horizontal row of loops known as a course; the measured fabric modulus being the resistance in grams-force a blade encounters when forcing the nonwoven or knitted fabric into a slot using IST 90.3(1).

2. The article of protective clothing of claim 1 wherein the first or second flame resistant knitted fabric has an average fabric modulus of 150 grams-force or less.

3. The article of protective clothing of claim 2 wherein the first and second flame resistant knitted fabric have an average fabric modulus of 150 grams-force or less.

4. The article of protective clothing of claim 1 in the form of a head covering.

5. The article of protective clothing of claim 1 in the form of a neck covering.

6. The article of protective clothing of claim 1 wherein the first and second flame resistant knitted fabric are different.

7. The article of protective clothing of claim 1 wherein the flame resistant nonwoven fabric is a fully aromatic polyimide.

* * * * *